July 26, 1966    G. PERRET    3,262,275
METHOD OF LAYING IMMERSED PIPE LINES
Original Filed Oct. 28, 1960    6 Sheets-Sheet 1
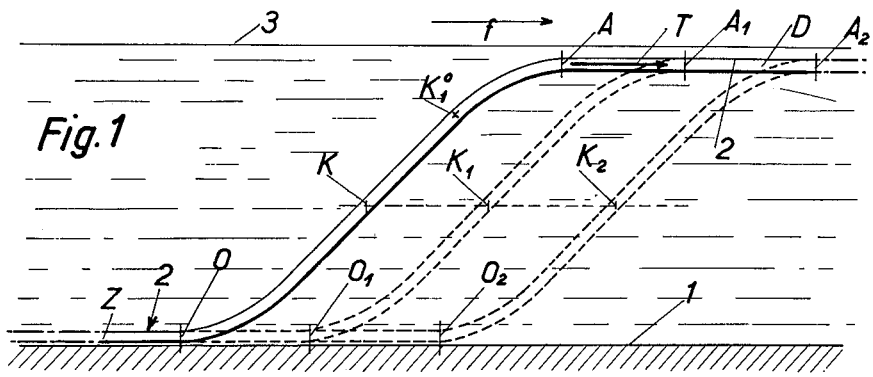
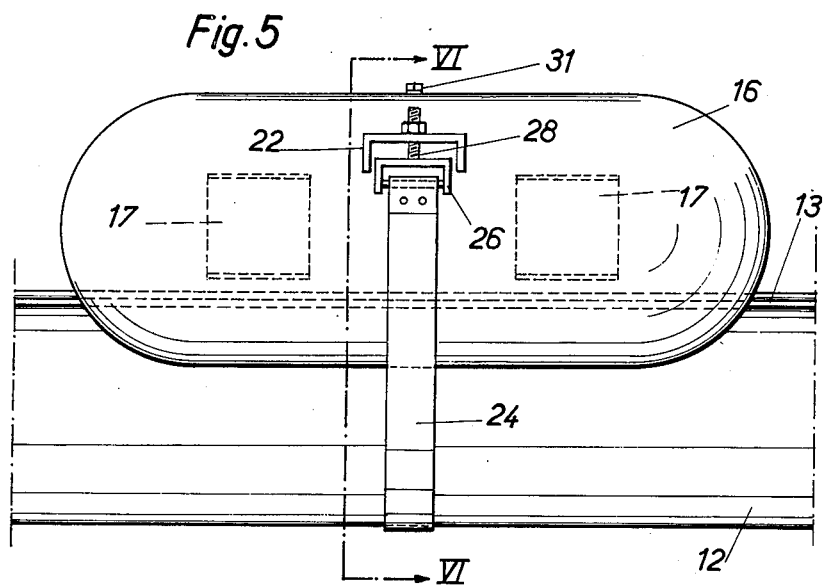
INVENTOR
GEORGES PERRET July 26, 1966          G. PERRET          3,262,275
METHOD OF LAYING IMMERSED PIPE LINES
Original Filed Oct. 28, 1960          6 Sheets-Sheet 2
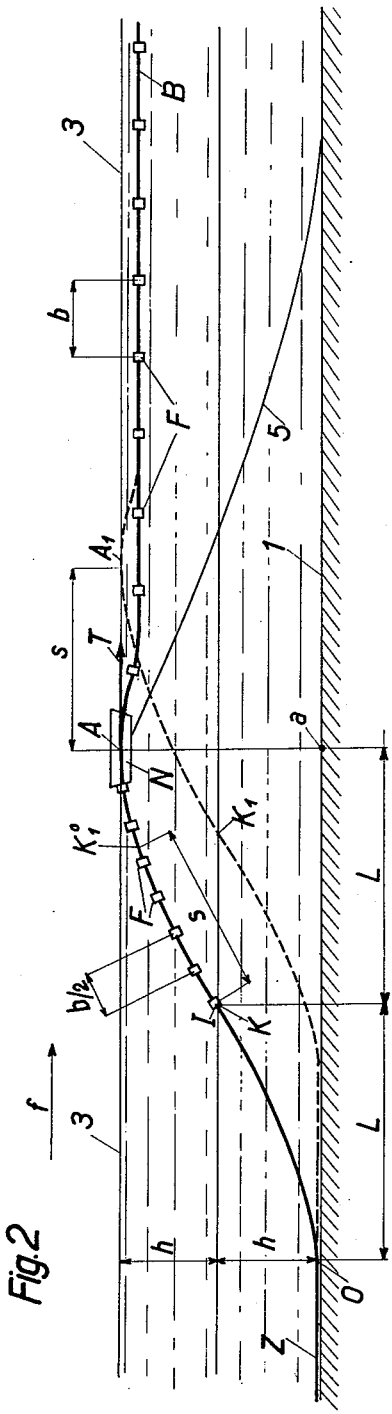
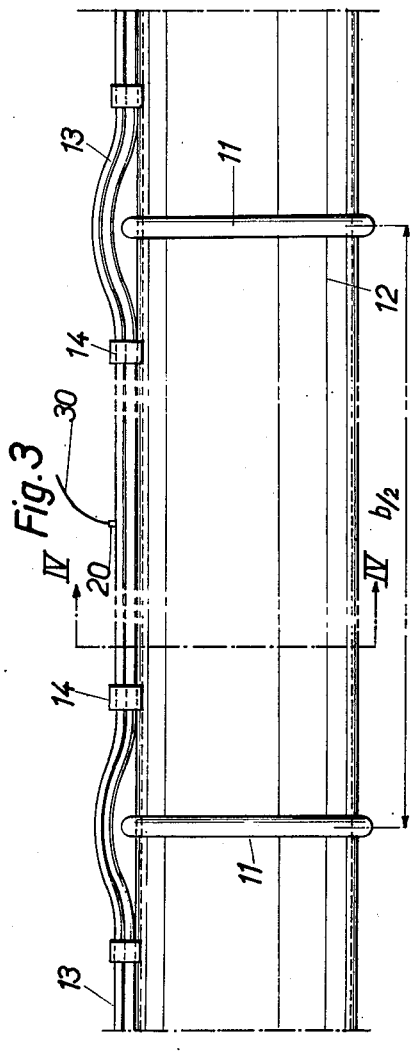
INVENTOR
GEORGES PERRET
By Irwin S. Thompson
ATTY.

July 26, 1966  G. PERRET  3,262,275
METHOD OF LAYING IMMERSED PIPE LINES
Original Filed Oct. 28. 1960  6 Sheets-Sheet 3

INVENTOR
GEORGES PERRET
By Irwin S. Thompson
ATTY.

July 26, 1966             G. PERRET             3,262,275
METHOD OF LAYING IMMERSED PIPE LINES
Original Filed Oct. 28. 1960             6 Sheets-Sheet 4
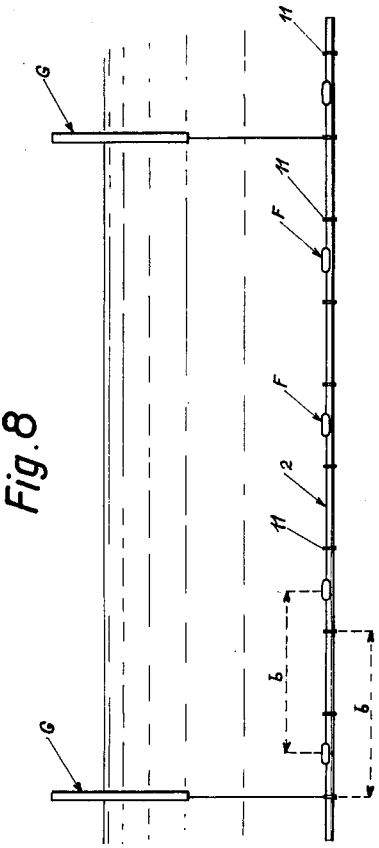
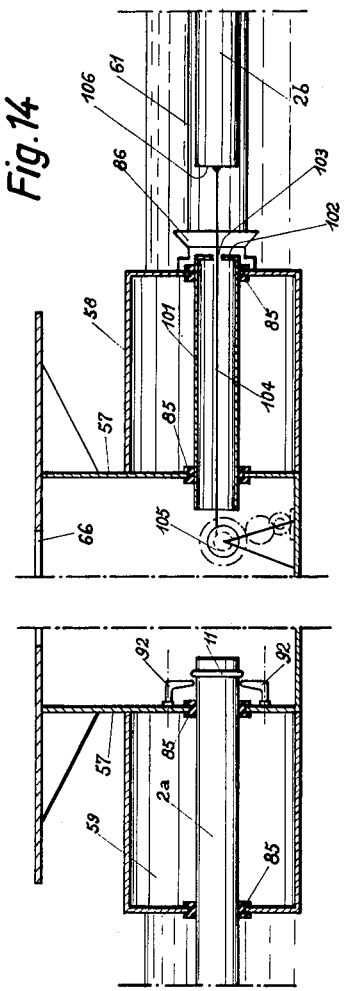
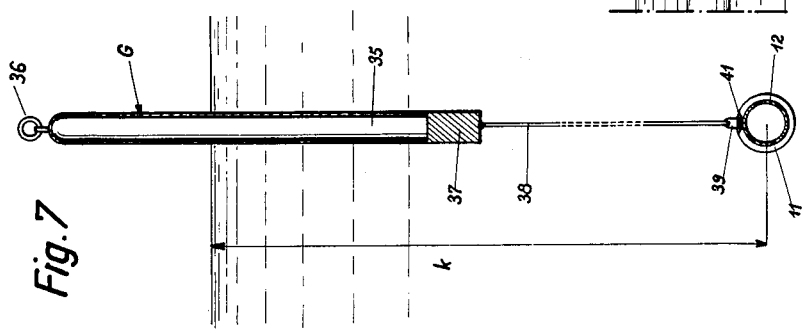
INVENTOR
GEORGES PERRET
By Irwin S. Thompson
ATTY.

July 26, 1966            G. PERRET            3,262,275

METHOD OF LAYING IMMERSED PIPE LINES

Original Filed Oct. 28, 1960            6 Sheets-Sheet 5

INVENTOR
GEORGES PERRET
By Irwin S. Thompson
ATTY.

July 26, 1966     G. PERRET     3,262,275
METHOD OF LAYING IMMERSED PIPE LINES
Original Filed Oct. 28, 1960     6 Sheets-Sheet 6
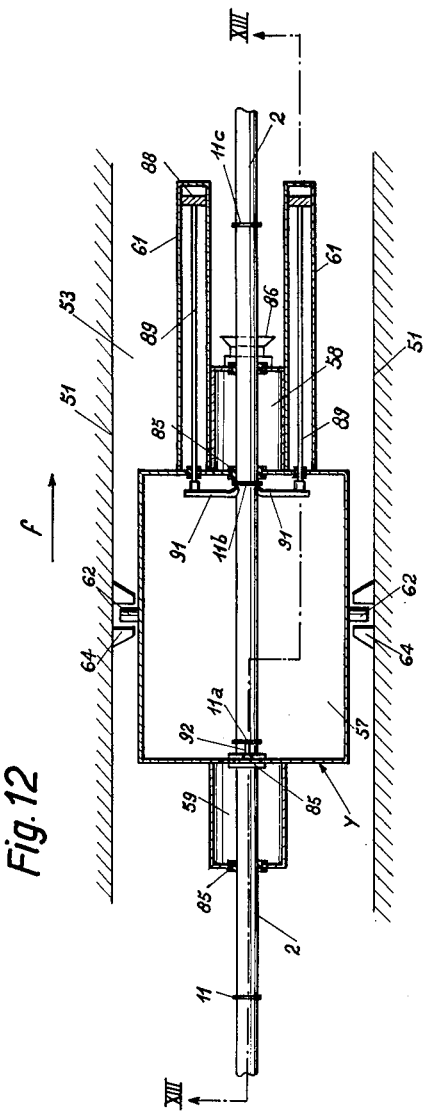
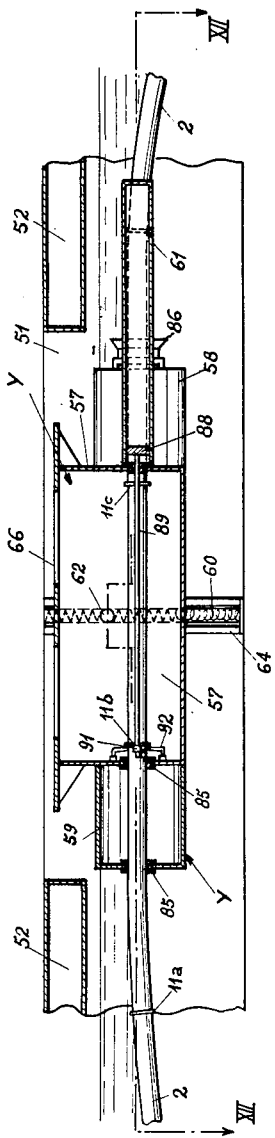
INVENTOR
GEORGES PERRET

United States Patent Office 3,262,275
Patented July 26, 1966

3,262,275
METHOD OF LAYING IMMERSED PIPE LINES
Georges Perret, 5 Square du Champ de Mars,
Paris, France
Continuation of application Ser. No. 65,795, Oct. 28,
1960. This application Apr. 5, 1965, Ser. No. 445,500
Claims priority, application France, Nov. 16, 1959,
810,225, Patent 1,292,209
5 Claims. (Cl. 61—72.3)

This application is a continuation of my copending application Serial No. 65,795, filed October 28, 1960, now abandoned.

The present invention relates to a process and apparatus for laying down a pipeline on an immersed bottom, notably a submarine bed.

This invention is more particularly directed to a pipeline intended for conveying liquid or gaseous hydrocarbons across a long submarine distance, such as is necessary for forwarding to Europe the gas from Sahara.

Various methods have been heretofore employed for laying down immersed pipelines. One of them consists in dragging along over the bottom the front portion of the pipeline, suitably reduced in weight and provided with a feed skid. However, this solution is not suitable in all cases, notably when the bottom is rocky or uneven.

Other methods have been theoretically contemplated, but have been given up due to the difficulties encountered in connecting the pipe portion near the surface or to the risks of losing the pipeline during the laying down operation.

The object of the present invention is to obviate the aforesaid drawbacks, allowing notably the laying down of the pipeline to be effected in a most simple and rapid manner, and under safe conditions.

According to the invention, the process for laying down a pipe along an immersed bottom consists in arranging the forces applied to the pipe portion connecting the pipe portion already laid down on the bottom to the portion to be laid down, which is lying near the surface, in such a manner that the connecting portion of the pipe assumes, by elastic deformation, an equilibrium contour having a point of inflection and ending at a substantially horizontal branch, said process further consisting in causing this controlled deformation of the pipe portion lying between the bottom and surface to progress in the direction of the laying down operation.

Preferably, the equilibium contour, having a point of inflection and a horizontal upper branch terminal portion, assumed by the pipe portion lying between the bottom and the surface, is obtained by giving to the upper branch a positive buoyancy and by subjecting its terminal portion to a horizontal traction exerted in the plane of the considered pipe portion and in the laying down direction the location along the pipeline of the positively buoyant branch and the point of application of the traction being moreover shifted in conjunction along the pipe in the direction of the laying down operation.

In an advantageous embodiment of the process according to the invention, the positively buoyant upper branch of the connecting pipe section extends across a height which is substantially one half of the depth of immersion of the pipeline and has a positive buoyancy equal, in absolute value, but opposed to the negative buoyancy of the lower branch.

Under these conditions, the value of the horizontal tractive force F applied to the end portion of the pipe section horizontal branch is substantially $P'H^2/2L$, where $P'$ designates the apparent weight per length unit of the pipe (hereinafter called linear apparent weight), $2H$ the depth of immersion and $2L$ the distance of immersion, i.e. the length, in horizontal projection, of the considered pipe portion.

In a practical manner of carrying out the invention, the pipe portion to be laid down is fitted at regular intervals with removable floats so that the buoyancy of said pipe portion will be substantially zero, the number of said floats along the upper branch of the involved pipe portion is increased by continuous fitting so that its buoyancy becomes positive, the floats are subsequently unhooked by remote control as they reach the desired depth, and the horizontal tractive force or traction exerted on the pipe is shifted along the latter at the rate of attachment of the additional floats.

Further particular features of the invention, relating notably to the equipment which may be used for carrying on the above-described process, will still result from the following description.

In the accompanying drawings, given by way of non-restrictive examples:

FIG. 1 is a quite simplified diagram showing in elevational view a pipeline being fitted in accordance with the process provided by the invention.

FIG. 2 is a more detailed diagram similar to FIG. 1.

FIG. 3 is a longitudinal elevational view of a pipe length.

FIG. 5 is a side elevational view of a pair of floats secured to the pipe.

FIG. 7 is an elevational cross-sectional view of a pipe portion before the laying down step.

FIG. 8 is a side view on a reduced scale of the same pipe portion.

FIG. 12 is a plane sectional view along XII—XII of FIG. 13 of the floating caisson in the floating workshop.

FIG. 13 is a fragmentary sectional view along XIII—XIII of FIG. 12.

FIG. 14 is a diagram similar to FIG. 13.

Figure 4:
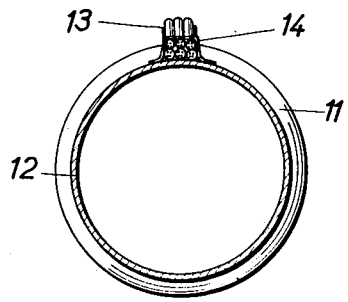
FIG. 4 is a sectional view along IV—IV of FIG. 3.
Figure 6:
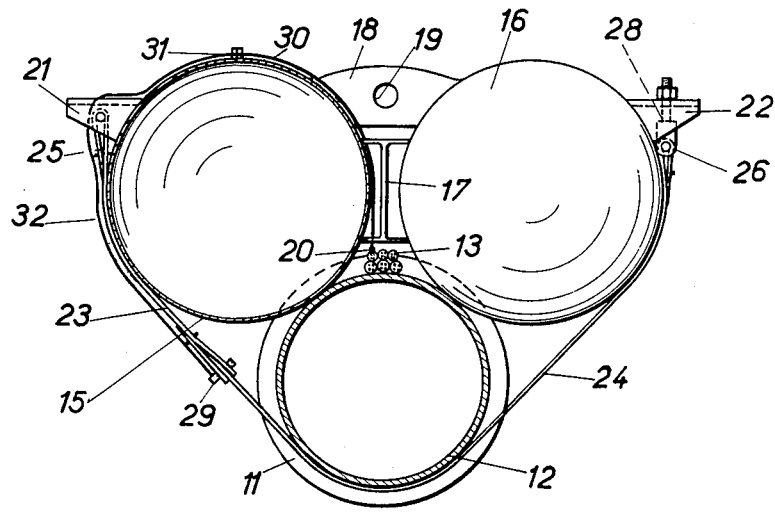
FIG. 6 is a corresponding cross-sectional view along VI—VI of FIG. 5.

The process according to the invention will first be set forth generally with reference to FIG. 1, wherein there is shown at 1 the bottom assumed to be flat and horizontal on which the pipeline 2 is to be immersed. This pipeline may consist of a steel tube suitably provided with a protecting coating. The bottom 1 may lie at any depth, for instance at 400 meters from the surface 3. The current action is assumed to be negligible.

The terminal portion of the already laid down pipeline resting on the bottom 1 is seen at ZO. The portion of the pipeline awaiting to be laid down may be seen at AD. This portion is held horizontal at the surface by any known means (such, for example, as boats or floats). It may also be arranged at a small distance below the surface, e.g. 10 to 15 meters, so as to avoid the action of the waves.

The exact position of the pipe portion AD with respect to the surface has no importance for the following.

The direction in which the laying down process is carried on, as indicated at $f$, defines the upstream and downstream sides relatively to pipe 2.

According to the invention, the pipe portions ZO and AD are located in the same vertical plane and are connected to each other by a pipe portion OA, which is in continuous and fluid-tight relationship with ZO and AD.

The pipe portion OA which thus lies between the bottom and the surface is subjected to a set of forces including its weight, the Archimedean buoyant force and external forces. According to the invention, this set of forces is so distributed as to create in the considered pipe portion such a resilient deformation of the metal that the natural equilibrium contour of pipe portion OA should show between O and A a point of inflection I (FIG. 2), and that the upper branch IA should end horizontally at A.

Since in the example described the bottom is assumed to be horizontal, the lower branch IO is also terminating horizontally.

Such a natural equilibrium contour of the pipe portion OA may be obtained by reducing the overall weight of the upper branch thereof by any means adapted to increase the buoyancy and by jointly exerting on the same branch of the pipe, either at or close to A, a horizontal traction, that is, a horizontal tractive force T, directed along $f$ and contained in the vertical plane passing through OA.

More precisely, the expression "apparent weight" of pipe 2 will be used to designate the difference between the natural weight of said pipe and the Archimedean force acting thereupon, taking into account both the buoyancy inherent to the pipe and the means provided to modify it.

Under such conditions, assuming K is a point which may be selected at will along the immersed pipe portion OA between O and A, provision is made according to the invention so that the linear apparent weight $P'$ of the lower branch OK of said pipe portion will be positive and equal to the linear apparent weight of the already laid down portion ZO.

On the contrary, downstream of the point K (which may be either distinct from the point of inflection I or coincident therewith), the apparent weight of the pipe is caused to be negative up to the point A at the end of the horizontal upper branch of the relevant pipe portion. This result is obtained by providing the pipe with any means adapted to increase its buoyancy.

To lay the pipe down onto the bottom, a controlled modification is caused to arise in the distribution of the forces in the system, said modification being produced in the direction $f$ along which the pipe is laid down.

More precisely, the following modifications are simultaneously produced: the point of application A of the tractive force T is shifted in the direction $f$ to the next position $A_1$ and a correlative change is created in the distribution of the apparent weights in the pipe portion OA which connects the two straight portions on the bottom and at the surface, so that point K is displaced along the pipe to assume the next position $K_1{}^0$.

This double change modifies the equilibrium contour of the pipe OA. Under the action of the downward force resulting from the increase in the weight of the lower branch, segment $AA_1$ bends down, while the lower branch of the pipe comes to lean on the ground. As the elastic deformation progresses along the pipe, a further pipe portion $OO_1$ is thus laid down on the bottom.

As the laying down proceeds, the equilibrium contour of the pipe thus assumes the successive positions OA, $O_1A_1$, $O_2A_2$, etc.

Of course, the change in the distribution of forces concerning the pipe may be effected continuously, the positions $K_1$, $K_2$ . . . $A_1$, $A_2$, etc. being very close to one another or, on the contrary, in a discontinuous manner, the corresponding points being distant from one another.

The rate at which the point of application of the tractive force T is displaced and the weight distribution modified relatively to the pipe are the factors determining the rate of the laying process, said rate being by definition the rate at which the pipe progresses along the bottom 1.

Thus, with the process according to the invention, the pipe portion OA is caused to proceed during the laying down operation in such manner as to keep constantly a doubly bent contour merging with the bottom at the moving point O and horizontally with the portion to be laid down at the moving point A. Taking into account the contemplated immersion depths and distances, the radii of curvature of the pipe portion OA remain at any point and at any instant such that the maximum stresses in the pipe are kept below a quite reasonable limiting value.

Moreover, this process allows for a substantially continuous and comparatively rapid laying down of the pipe under controlled conditions.

Besides, it is clear that the process according to the invention may still be applied even where the bottom 1 is not horizontal, on condition that the variations in depth be not too abrupt.

A practical manner of carrying on the aforesaid process will now be described, assuming, by way of a nonrestrictive example that the line consists of a pipe, 400 mm. in diameter and 15 mm. thick, to be laid down onto a bottom 400 meters deep, it being understood that the process according to the invention remains applicable irrespective of the pipe diameter and immersion depth.

The inherent weight of the empty pipe is assumed to be 156 kg. per meter and, taking into account particular fittings which will be described hereinafter, the overall linear weight, when empty, is 165 kg. per meter.

The average Archimedean force in the sea being 149.5 kg. per meter, the apparent linear weight $P'$ of the immersed pipe is only 15.5 kg. per meter.

According to the present invention, provision is made to the effect that, at any given instant between two stages of controlled deformation of the pipe portion connecting the bottom to the surface, the apparent linear weight of said portion will be $+P'$ between O and the middle point K of OA, and $-P'$ between K and A (FIG. 2).

Provision is further made for the pipe portion AB awaiting to be laid down to have an apparent weight of zero value. This portion may be of substantial length (1,000 to 2,000 meters for example) and may consist of tube elements of conventional length (e.g. 12 meters) previously fitted together in the harbor.

Since the pipe portion AB to be laid down is given a zero apparent weight, it is equilibrated in water in all positions. On the contrary, branch KA, having a negative apparent weight (or positive buoyancy) tends to float on the water, and branch OK, having a negative buoyancy, tends to work its way down to the bottom.

Such a result is obtained by arranging on pipe 2, between A and B, floats F which may, for example, apply a vertical upward force of 155 kg. and may be spaced apart a distance $b=10$ meters. Besides, the number of floats F is doubled along branch KA (the float spacing being here $b/2=5$ meters), while, reversely, no float is provided on branch OK.

The floats F are doubled in number as from point A by means of a floating workshop N stationed at A, whereby the additional floats are hooked up in a manner to be set forth hereinafter. Means are moreover provided aboard of the floating workshop N for applying to pipe 2 the horizontal tractive force T required for producing the desired equilibrium contour in the pipe portion OA.

The floating workshop N may be held in position by anchoring chains. However, provision is advantageously made according to the invention for trimming the workshop N by means of towing chains 5 of great length which are secured to the bottom 1 far away from the laying down point and are wound around winches of the floating workshop N, the latter being thus allowed to progress by towage.

Provision is further made for securing the floats F along pipe 2 in a removable manner so that these floats may be remotely unhooked by means of a suitable remote control device, for example from workshop N. Another solution is to cause the floats to be automatically unhooked at a predetermined depth by means of pressure-sensitive control devices.

In all cases, the pipe being sustained as indicated above, it may be demonstrated that with a sufficient horizontal traction T, the equilibrium curvature of portion OA consists of a half arc of a parabola having a vertical axis and concave upwards, from O to K; and of the half arc of a parabola symmetrical to the latter about L, concave downwards from K to A. Both arcs end horizontally at O, and at A and are joined tangentially at K, which is the point of inflection.

Assuming 2L designates the distance of immersion (horizontal projection Oa of portion OA) and 2h the depth of immersion, then the following relation exists between the tractive force T and the resultant apparent linear weight P':

$$T = P'L^2/2h \qquad (1)$$

On the other hand, if X designates the maximum bending unit stress for the extreme fibers at A and O, r the pipe radius, and E Young's modulus, then the following is also true:

$$T = P' \cdot r \cdot E/X \qquad (2)$$

Thus, once the reduced pipe weight, i.e. P', and the permissible bending unit stress X have been settled, there may be deduced therefrom the tractive force T to be applied at A, as well as the characteristics of the equilibrium curve as a function of depth.

Moreover, it will be seen that the tensile force is only dependent on the permissible bending stress X and on the apparent weight P', irrespective of the immersion depth. Said tractive force T, which is a tensile force, therefore remains theoretically constant, notwithstanding the variations in depth.

Preferably, the parameters T and X are kept constant all through the laying down process. As a result, the distance of immersion varies as a function of depth. This distance 2L serves to determine the location of point K, below which the pipe portion OA should not be supported by the floats.

For a bending unit stress assumed to be 2 kg./mm.², calculations show that the tractive force T should be 30 metric tons. It may be reduced to 12 metric tons if the permissible value of X is 5 kg./mm.².

In the first-mentioned case, with a depth $2h = 400$ m.; $2L = 1,735$ m.

In the second case, with the same depth, the distance of immersion is 1,110 m.

When carrying on the laying down process, the displacement of the portion OA in the direction f is produced in the following manner:

The workshop N is towed along the cables 5 and thus caused to progress by a distance s. During this displacement, the pipe 2 remains subjected to the traction T, but the point of application of this tractive force T is gradually shifted to $A_1$, spaced apart from A by the distance s.

Besides, during this displacement, the number of floats F hooked up to the pipe between A and $A_1$ is doubled, so that the apparent weight per length unit of the pipe is changed along the length $AA_1$ from 0 to $-15.5$ kg.

Then the floats F upstream of K, i.e. located between K and $K_1^0$, are unhooked along the same distance s, this being preferably effected by remote control from the floating workshop N.

These concomitant operations are preferably effected in a substantially continuous manner. Finally, the pipe assumes a new equilibrium contour $O_1$, $K_1$, $A_1$ parallel to OKA, and the stress distribution remains the same on the new pipe portion involved, since the tractive force remained constant.

It may be demonstrated that if the actual depth of bottom 1 is at a substantial variation with that forecast, then it is possible, by suitably adjusting the value of the tractive force T, to keep the end portion of the upper branch OA horizontal, this being an important requirement for the satisfactory achievement of the laying down operation.

There is no risk of bringing about a dangerous modification in the pipe working unit stress.

Description will now be given of an equipment whereby the above-described process may be carried on, said equipment including floats adapted to be unhooked by remote control and a floating workshop adapted to be displaced by towage.

Advantageously, the pipeline according to the invention may be fitted at regular intervals with collars 11 having rounded edges, which are secured to the wall 12 (FIGS. 3 and 4). As will be set forth hereinafter, the collars 11 afford a grip, whereby the tractive force T may be more easily applied to the pipe.

Arranged along the pipe 2 is a bundle of electric wires 13 contained in a sealed sheath and secured by means of clips 14. These wires are particularly intended for the remotely controlled unhooking of the floats F, as will be explained. For this purpose, sealed outlets 20 are provided at even spacing on the wires 13 for the passage of flexible fluid-tight wires 30.

In an advantageous embodiment provided for a maximum immersion of the order of 200 meters, the device for setting the pipe afloat comprises in the predetermined locations pairs of floats 15, 16 consisting of hollow cylindrical air tanks made of thin metal sheet, with spherical end portions. The two floats in each pair are rigidly interconnected by crossbars 17 and by a transverse central yoke 18 wherein a hole 19 is provided for handling purpose.

Within the scope of the above numeral example, the floats 15 or 16 may have the following characteristics:

Overall length: 1.35 m.—Internal diameter 0.5 m.—Thickness 10 mm.—Theoretical weight 175 gk.—Actual weight 185 kg.—Ascensional force: 77.5 kg.

Each float 15, 16 is provided with a lateral bracket 21, 22 serving to secure metal sheet straps 23, 24 which are pivoted by means of bows 25, 26, the latter being adjustable by means of a screw 28.

When the considered pair of floats is positioned on pipe 2 between two collars 11, the bodies 15 and 16 come to bear against the wall 12 and the two straps 23, 24 are connected together in such manner as to embrace pipe 2. They are secured to each other by means of an explosive rivet 29 which is located opposite to the gap existing between pipe 2 and float 15. A connecting terminal 31 carried by the float serves to connect the wire 30 to the firing wire 32 leading to the rivet 29.

The attachment of this assembly and the connections of each explosive rivet 29 are effected in the harbor, when the pipe portions are fitted up together. The length of electric cable leading to a firing terminal 31 is at least half of the length of immersion 2L.

Under these conditions, when a pair of floats 15, 16 has reached the point K, at the depth h and immersion distance L, an electric impulse is sent to the relevant explosive rivet 29 through the corresponding wires 13, 30, 32.

The rupture of the straps 23, 24 results in the release of the floats 15, 16 which are of such shape as to be able to clear the pipe in all cases, irrespective of the inclination of the latter.

The floats are thus raised back to the surface, where they are recovered.

As concerns the pipe portion AB awaiting to be laid down, fitted with floats F spaced apart a distance b, the apparent weight is, as stated above, substantially zero. However, in a preferred embodiment, this pipe was given a slightly positive apparent weight and complemented with a set of auxiliary floats G of the acidimeter type.

The purpose of these floats is to keep the very long pipe portion which is brought to the laying point at a predetermined depth which is dependent on the sea agitation as well as on the ship transit. This depth k may range from 8 to 20 meters and may, for example, be 12 meters.

Each float G consists of a hollow cylinder provided at its upper end with a handling hoop 36 and at its lower end with a ballast 37 having secured thereto a beaconing chain 38 leading to a snap hook 39 caught in an opening 41 in the collars 11.

Such a float may have the following characteristics: height, 8 meters; diameter, 40 cm.; thickness, 5 mm.; total weight, 1,420 kg.; including 865 kg. for the ballast. The Archimedean force being 129 kg./meter, it is clear that a wave 4 meters in height involves only an action of ±250 kg. on the pipe, the inertia of which represents more than 8.5 metric tons.

The floats G may be spaced apart along pipe 2 by 4$b$, i.e. 40 m. They moreover act as beacons for the pipe pending the laying down operation (FIG. 8).

The floating workshop N (FIGS. 9 to 11) serves various purposes:

It acts as a support for the floating caisson Y, through which the pipe 2 is borne. Within this caisson, the following operations are effected: continuous application of the traction T to the pipe, displacement of the point of application of this traction along the pipe, and assembling of the floating pipe portions;

It is adapted to be towed along the submerged cables 5;

It comprises the handling and storing arrangements required for setting and releasing the floats F and G;

It is equipped to supply the power (compressed air, electric current) required for the various works involved and for the maintenance of the staff; and Finally, it may be self-propelled.

In the particular embodiment shown, the floating workshop N consists of two pontoons 51 parallelly arranged and rigidly interconnected by crossbeams 52. There is thus provided between the two pontoons 51 a channel 53 for the pipe 2. The channel 53 has its inlet and outlet protected against the waves by grids 54 or other protective means acting as breakwaters and it comprises, at low depth but beneath the plane of passage of pipe 2, grids 55 which serve as bridges and are intended to facilitate the fitting and removal of the floats by the staff.

Located in the middle of the channel 53 is the floating caisson Y comprising a caisson proper 57 having two axial extensions consisting of a pair of cylindrical lock chambers 58, 59, with pipe 2 passing through this assembly. Disposed on either side of chamber 58 are the bodies 61 of two jacks. The caisson 57 carries along its transverse axis two pivot pins 62 inserted in slideways 64 and urged back to the middle position by resilient means 60 such as springs. With this arrangement, the caisson is free to move in the vertical direction along the slideways and to oscillate around the axis of pivot pins 62. The upper part of caisson 57 is provided with openings 66 which may be stopped up in case of heavy weather by panels, not shown. The internal equipment of the floating caisson Y will be described hereinafter.

While it may be equipped with a self-propelling system comprising a propeller, not shown, the floating workshop N also comprises a towage system including in each pontoon 51 a winch 68 having wound thereon the towing cable 5 which extends across the front wall of the pontoon through packing boxes 69.

Figure 9:
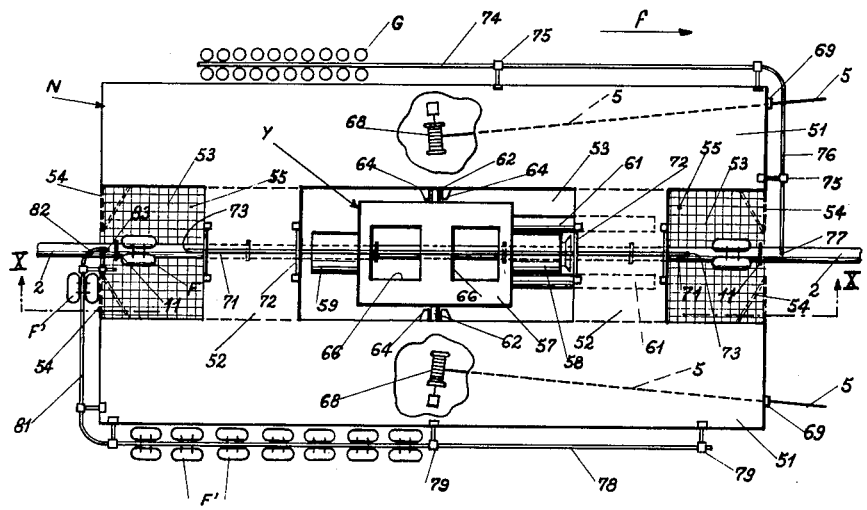
FIG. 9 is a plane view of a floating workshop adapted to carry on the process according to the invention.
Figure 10:
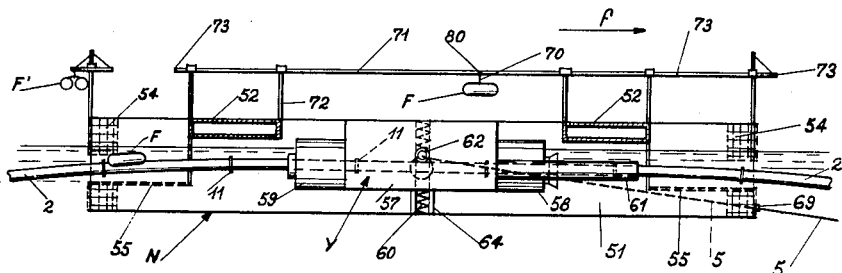
FIG. 10 is an elevational sectional view along X—X of FIG. 9.
Figure 11:
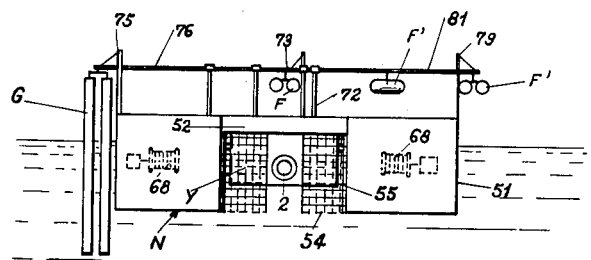
FIG. 11 is an end view of the floating workshop.

FIGS. 9 to 11 show a quite simplified diagram of the float-handling arrangement. The latter comprises a monorail 71 arranged along the axis of channel 53. This monorail is supported by members 72, and its ends 73 are located plumb with the bridges 55. The monorail 71 serves as a carrier for the floats F, each secured by a cable 70 to a carriage 80 fitted on this rail.

The workshop N also carries a first lateral monorail 74 carried by brackets 75 and having a branch 76 which runs along the front part of one pontoon 51 to end at 77 plumb with the point where pipe 2 enters channel 53. This monorail serves as a carrier for the auxiliary floats G.

The second lateral monorail 78 is located on the other side of the floating workshop N. It is carried by brackets 79 and has a side branch 81 which runs along the rear wall of one pontoon 51 and is bent at 82 to terminate at 83 plumb with the rear bridge 55. The monorail 78 serves as a carrier for the auxiliary floats F which may either be each suspended by a winch to a carriage, as those of monorail 71, or may be simply attached to a carriage and float on the water, the former solution being however preferable.

The float-handling arrangement may still include any other known lifting apparatus, such as pivoting or traveling cranes, not shown.

The floating caisson (FIGS. 12 and 13) is so designed that pipe 2 remains immersed so as not to be too heavy and is kept substantially horizontal, the work thereon being, however, effected under dry conditions.

For this purpose, the front chamber 58 and the rear chamber 59, serving as lock chambers wherethrough the pipe enters and leaves the caisson 57, are provided with flexible packings 85 adapted to undergo sufficient distortion for allowing the passage of the collars 11 or other projecting means. The insertion of pipe 2 in chamber 58 is facilitated by a mouthpiece 86. The jacks 61 each contains a piston 88 whereof the rod 89 terminates in pivoted nippers 91.

Due to their pivoted connection, the nipper jaws 91 may engage a collar 11 of pipe 2 or be retracted therefrom. The jacks 61 are provided with a control system including an oil or compressed air line with suitable valve means. Similarly, the lock chambers 58 and 59 are provided with compressed air exhaust systems. These various systems which are known per se have not been shown, for clarity's sake.

At the other end of the caisson 57, in front of the inlet to the rear chamber 59, is a set of retractable abutments 92.

In their working position, the abutments 92 serve to prevent a collar 11 of pipe 2 from entering chamber 59. These abutments may be cleared off for example by being retracted tangentially to pipe 2.

The length of the caisson 57 is preferably greater than spacing $b/2$ (i.e. 6 meters in the example described) between two consecutive collars 11 on the pipe 2. Similarly, the strokes of jacks 61 are slightly greater than $b/2$.

The various laying down operations are as follows:

Assuming the jacks 61 are in the retracted position, the rods 89 being within the cylinders and nippers 91 engaging collar 11$b$ while abutments 92 are in their locking position and the towage winches 68 are applying to cables 5 a tractive force T, it will be understood that the pipe 2 is subjected at the level of the caisson 57 to the tractive force T (e.g. 15 metric tons). Under these conditions, if abutments 92 are cleared off, allowing collar 11$a$ to pass freely, if the jacks 61 are under an air pressure load corresponding to the tractive force T and if the longitudinal stress exerted by the winches 68 on the towing cables corresponds to a force applied to the workshop N in the direction $f$, greater than T, it will be understood that said workshop will tend to drive pipe 2 in the same direction, due to the clamping action exerted by the jaws 91 on collar 11$b$. However, since the pressure in the jacks is adjusted to correspond to a 15 metric tons force while the force applied by the winches is higher, pipe 2 will remain stationary and subjected to the tractive force T, whereas the workshop will progress in the direction $f$. Consequently, the rods 89 of jacks 61 will gradually project into the caisson 57 while, for an observer stationed on the workshop, collar 11$a$ will successively clear the packings 85 of the lock chamber 59, a further collar 11$c$ simultaneously entering lock chamber 58. When the jacks reach their end-of-stroke positions (FIG. 13), collar 11$b$ has registered with abutments 92, the latter having in the meantime resumed their locking position. By this time, collar 11$c$ has entered caisson 57.

The jaws 91 may then be disengaged from collar 11b, the jacks 61 are retracted, and jaws 91 come to grip collar 11c while abutments 92 are being retracted. This sequence of operations is then cyclically repeated.

The floating workshop N may thus be caused to progress continuously along the pipe 2 while the latter remains constantly subjected to the tractive force T.

The rate at which the workshop N progresses by towage defines the laying down rate for pipe 2.

As the workshop N progresses, an electric firing pulse is sent through the wires 13 to the explosive rivet 29 of a pair of floats each time the latter have reached the depth h.

It will be appreciated that the resilient suspension system of caisson 57 and the extent of freedom afforded thereto by its particular connection with the workshop N, as well as the structure of the latter, provide a large degree of protection of the caisson against the swell effects. The provision of two winches 68 and two towing cables 5 allows for a correctly centered traction T and better guiding of the workshop. The various laying down operations may be synchronized by means of suitable servo-control systems.

During these operations, the handling of the floats is as follows: when an auxiliary float G reaches grid 54, it is hooked up to a carriage of the monorail 74 and driven to the rear portion thereof to be stored.

The floats F spaced apart by b are admitted into the channel 53, where they are disconnected from pipe 2 and conveyed by a carriage on the central monorail 71 to the rear end of this monorail.

The floats F are subsequently refitted on pipe 2 and secured thereto. Since the number of floats F has to be doubled along this portion of the pipe, there is interposed between two floats F brought along by the central monorail 71 an additional float F' conveyed by the second lateral monorail 78. These handlings may be effected without difficulty.

The coupling of a pipe portion to the following length may be achieved by thoroughly welding the two lengths together within the caisson 57. For practical achievement of this operation, the two lengths may be brought into contact as shown on FIG. 14.

The terminal portion 2a of the pipe is held by means of the retractable stops 92 retaining the last collar 11, the tractive force T being thus applied through the towing winches. The terminal portion of pipe 2a has served to introduce into chamber 58 a pipe element 101 provided with a bottom 102 pierced with an orifice 103 for the passage of a cable 104 which, on the one hand, is wound around a winch 105 located in the caisson 57 and, on the other hand, leads to the welded bottom 106 and the second pipe portion 2b. When started, winch 105 causes pipe 2b to enter the mouthpiece 86 and this pipe will drive element 101 forward when proceeding into chamber 58. Any penetration of a bulk of water is thus prevented. The element 101 is then dismantled and the bottom 106 removed, whereby the welding step may be carried out on portions 2a, 2b.

From the foregoing description, it will be appreciated that the process according to the invention may be applied by means of technical arrangements of easy construction and remaining within the scope of the equipment normally employed for the work at sea. It is, however, evident that several modifications might be provided for the application of the process without departing from the scope of this invention.

Having described my invention, I claim:

1. In a method for laying a hollow steel pipe to be used as a pipeline on an immersed bottom from one shore to another shore by imparting to said pipe a resilient deformation in an immersed section thereof that joins a pipe portion already laid to a pipe portion awaiting to be laid with the latter portion adjacent the vicinity of but below the surface of the water and in a position substantially parallel to the surface of the water, said deformation being such that said pipe section has a lower branch tangential to the bottom and an upper branch having a horizontal terminus and an S-curve between the bottom and said horizontal terminus, the S-curve having an inflection point between said branches, said section progressively sinking to the bottom during laying of the pipe so that the S-curve advances toward said another shore with said horizontal terminus moving above and in advance of said inflection point and said inflection point moving above and in advance of the point at which said lower branch is tangential to the bottom, with said horizontal terminus and said inflection point and said tangential point all advancing in that order lengthwise along the pipe, said pipe further having by itself when immersed a negative buoyancy; the improvement comprising imparting to said upper branch a positive buoyancy by fixing to said portion awaiting to be laid float means that are immersed and extend lengthwise along the pipe and sink with said upper branch, exerting on a portion of said pipe awaiting to be laid a horizontal traction in the direction of said another shore, relieving the buoyant force of the portions of said float means in the vicinity of said inflection point as each of said portions of said float means successively reaches the vicinity of said inflection point to the extent that the buoyancy of the pipe changes from positive to negative and at the same time said float means continues to impart to said upper branch a positive buoyancy and said lower branch maintains a negative buoyancy as said S-curve advances toward said another shore during the progressive sinking of the pipe, and fixing to said pipe portion awaiting to be laid further float means substantially continuously replacing the buoyancy of said portions buoyantly relieved in the vicinity of said inflection point.

2. A method as claimed in claim 1 wherein the negative buoyancy of said lower branch is about equal in magnitude to the positive buoyancy of said upper branch.

3. A method as claimed in claim 1 wherein said traction is proportional to the square of the distance of immersion which is the longitudinal dimension in horizontal projection of said immersed pipe section and inversely proportional to the depth below said horizontal terminus.

4. A method according to claim 1 and comprising imparting to said pipe portion awaiting to be laid a buoyancy substantially equal to zero by fitting thereon removable floats at regular intervals, imparting to said pipe upper branch a positive buoyancy by fitting thereon additional removable floats adjacent said horizontal terminus during the progressive sinking of said pipe, said method further comprising releasing all the floats from said pipes when they reach said inflection point.

5. A method according to claim 1 and wherein said pipe traverses adjacent said horizontal terminus a floating workshop provided with gripping means for said pipe, wherein said horizontal traction is exerted on said pipe by gripping said pipe with said floating workshop gripping means, said process further comprising towing said workshop along said pipe portion awaiting to be laid in the direction of said another shore.

References Cited by the Examiner

UNITED STATES PATENTS

| | | | |
|---|---|---|---|
| 2,770,950 | 11/1956 | Collins | 61—72.3 |
| 2,910,835 | 11/1959 | Timothy | 61—72.3 |

FOREIGN PATENTS

| | | |
|---|---|---|
| 1,206,378 | 8/1959 | France. |
| 1,230,014 | 3/1960 | France. |
| 863,000 | 3/1961 | Great Britain. |
| 128,713 | 7/1960 | U.S.S.R. |

OTHER REFERENCES

Construction Methods, page 101, June 1958.

EARL J. WITMER, *Primary Examiner.*